United States Patent
D'Alessandro et al.

(10) Patent No.: US 11,459,959 B2
(45) Date of Patent: Oct. 4, 2022

(54) METHOD FOR STARTING A GAS TURBINE

(71) Applicant: General Electric Company, Schenectady, NY (US)

(72) Inventors: Giuseppe D'Alessandro, Florence (IT); Marta Mampreso, Florence (IT)

(73) Assignee: General Electric Company, Schenectady, NY (US)

(*) Notice: Subject to any disclaimer, the term of this patent is extended or adjusted under 35 U.S.C. 154(b) by 26 days.

(21) Appl. No.: 16/707,730

(22) Filed: Dec. 9, 2019

(65) Prior Publication Data
US 2020/0116086 A1   Apr. 16, 2020

Related U.S. Application Data

(63) Continuation of application No. 15/126,629, filed on Sep. 16, 2016, now Pat. No. 10,533,503.

(51) Int. Cl.
*F02C 9/32*   (2006.01)
*F02C 7/22*   (2006.01)
(Continued)

(52) U.S. Cl.
CPC .............. *F02C 9/32* (2013.01); *F02C 7/222* (2013.01); *F02C 7/228* (2013.01); *F02C 7/232* (2013.01);
(Continued)

(58) Field of Classification Search
CPC .......... F02C 7/222; F02C 7/228; F02C 7/232; F02C 7/236; F02C 7/26; F02C 7/264;
(Continued)

(56) References Cited

U.S. PATENT DOCUMENTS 2,971,575 A   2/1961   Williams
3,729,929 A   5/1973   Kiscaden
(Continued)

FOREIGN PATENT DOCUMENTS

AU   627940 B2   9/1992
EP   1985822 A2   10/2008
(Continued)

OTHER PUBLICATIONS

Publication of Italian Patent Application "Metodo Per L'avvia Di Una Turbina A Gas", Document No. 102014902243660A1, Published Sep. 18, 2015 (Year: 2015).*
(Continued)

*Primary Examiner* — Scott J Walthour
(74) *Attorney, Agent, or Firm* — Dority & Manning, P.A.

(57) ABSTRACT

A method of starting a gas turbine and related apparatus, the method including keeping a main fuel line in a sealed state while allowing fuel to flow from a fuel source to at least one nozzle of a nozzle array via an auxiliary fuel line; firing a gas turbine while keeping the main fuel line in the sealed state; and after combustion has started: opening the main fuel line to commence a flow of fuel from the fuel source to the at least one nozzle of the nozzle array via the main fuel line, sealing the auxiliary fuel line, and after the auxiliary fuel line is sealed, increasing the flow of fuel from the fuel source to the at least one nozzle of the nozzle array via the main fuel line.

19 Claims, 3 Drawing Sheets

(51) Int. Cl.
*F02C 7/264* (2006.01)
*F02C 7/26* (2006.01)
*F02C 9/28* (2006.01)
*F02C 7/232* (2006.01)
*F02C 7/228* (2006.01)
*F02C 7/236* (2006.01)

(52) U.S. Cl.
CPC ............... *F02C 7/236* (2013.01); *F02C 7/26* (2013.01); *F02C 7/264* (2013.01); *F02C 9/28* (2013.01); *F05D 2220/32* (2013.01); *F05D 2240/35* (2013.01); *F05D 2260/85* (2013.01)

(58) Field of Classification Search
CPC ...... F02C 7/32; F02C 7/34; F02C 9/32; F02C 9/34; F05D 2260/85; F05D 2260/99
See application file for complete search history.

(56) References Cited

U.S. PATENT DOCUMENTS

| | | | |
|---|---|---|---|
| 4,292,801 A | 10/1981 | Wilkes et al. | |
| 4,378,673 A | 4/1983 | Abo et al. | |
| 6,082,095 A | 7/2000 | Akimam | |
| 7,481,061 B2 | 1/2009 | Gadde et al. | |
| 2001/0047650 A1* | 12/2001 | Muller | F23R 3/343 60/776 |
| 2003/0056521 A1 | 3/2003 | Dewis | |
| 2005/0198964 A1 | 9/2005 | Myers et al. | |
| 2006/0016198 A1* | 1/2006 | Stuttaford | F02C 7/22 60/734 |
| 2007/0079593 A1 | 4/2007 | Fujii et al. | |
| 2007/0089395 A1 | 4/2007 | Fujii et al. | |
| 2007/0271024 A1 | 11/2007 | Fujii et al. | |
| 2008/0006033 A1* | 1/2008 | Scarinci | F02C 3/14 60/776 |
| 2008/0115501 A1* | 5/2008 | Elkady | F23R 3/14 60/776 |
| 2008/0256954 A1 | 10/2008 | Dooley | |
| 2010/0058770 A1 | 3/2010 | Ryan | |
| 2012/0042658 A1 | 2/2012 | Eto et al. | |
| 2012/0130553 A1 | 5/2012 | Purani et al. | |
| 2013/0055719 A1* | 3/2013 | Ogata | F23K 5/06 60/740 |
| 2013/0089395 A1 | 4/2013 | Fairhurst et al. | |
| 2013/0180250 A1 | 7/2013 | Harada et al. | |
| 2013/0247578 A1* | 9/2013 | Deuker | F02C 9/46 60/776 |

FOREIGN PATENT DOCUMENTS

| | | | | |
|---|---|---|---|---|
| EP | 2187023 B1 | 2/2012 | | |
| JP | 1976071411 A | * | 6/1976 | ............... F02C 7/26 |
| JP | S5171411 A | | 6/1976 | |
| JP | S61207830 A | | 9/1986 | |
| JP | 2000008877 A | * | 1/2000 | ............... F02C 3/30 |
| JP | 2000008877 A | | 1/2000 | |
| WO | WO-2015140200 A1 | * | 9/2015 | ............. F02C 7/222 |

OTHER PUBLICATIONS

Machine Translated Japanese Office Action Corresponding to Application No. 2020093428 dated Sep. 29, 2021.

* cited by examiner

METHOD FOR STARTING A GAS TURBINE

CROSS-REFERENCE TO RELATED APPLICATIONS

This is a continuation of U.S. patent application Ser. No. 15/126,629, filed Sep. 16, 2016, which is a U.S. National Stage Application under 35 U.S.C. 371 of International Application No. PCT/EP2015/055647, filed Mar. 18, 2015, which claims priority to Italian Patent Application No. CO2014A000007, filed Mar. 18, 2014; the entire disclosure and contents of each application listed above is incorporated herein by reference.

BACKGROUND

Embodiments of the present invention relate to a method for starting a gas turbine. Such method is potentially applicable to every kind of gas turbine, such as the ones used for mechanical power (compressors or pumps drive) and for power generation (electrical generators).

A gas turbine is known from the state of the art, comprising a combustion chamber provided With one or more nozzles. Such nozzles are used to inject fuel, which is then burned inside the combustion chamber. The hot exhaust gases that exit the combustion chamber are then used to move an impeller attached to a shaft, thus providing mechanical work.

An apparatus for regulating the flow of fuel in such gas turbine is also known. The apparatus comprises a fuel line, which in operation is connected with a fuel inlet and with the nozzles of the gas turbine. Indeed, the fuel line has the function of transferring fuel from the inlet to the nozzles. A regulating valve is placed along the fuel line, so that the flow of fuel can be controlled. Thus, in order to start the turbine, the regulating valve is opened to a defined stroke and a small flow of the is allowed to enter inside the combustion chamber. A spark then ignites the fuel and, afterwards, the flow of fuel can be increased further, until a desired operating condition is achieved.

An aspect of the prior art is that, in case of a malfunction of the regulating valve, too much fuel can be allowed inside the combustion chamber before the ignition. This is potentially extremely dangerous, as it can lead to an explosion of the gas turbine or its exhaust duct with high risk of injuries or fatalities of personnel. For this reason, the known turbines are provided with a safety device designed to interrupt the flow of fuel in case of malfunction. Indeed, such safety device may comprise a flow meter placed on the fuel line downstream of the regulating valve

BRIEF DESCRIPTION

A first embodiment of the present invention therefore relates to a method of starting a gas turbine. Such method comprises the step of providing an apparatus for regulating the flow of fuel in a gas turbine. The apparatus comprises a main line fluidly connectable with a fuel source and with a nozzle array for transferring fuel from the fuel source to the nozzle array. The apparatus also comprises an auxiliary line fluidly connectable with the fuel source and with the nozzle array for transferring fuel from the fuel source to the nozzle array.

The method comprises the step of keeping the main line sealed while increasing the auxiliary line fuel flow rate. The method also comprises the step of firing the gas turbine while keeping the main line sealed. After the combustion has started in the gas turbine, and when auxiliary line reaches about its maximum capacity, the main line is opened to increase the main line fuel flow rate. The auxiliary line maximum flow rate is less than the main line maximum flow rate.

In an embodiment, the gas turbine can be started in an intrinsically safe manner, since the auxiliary line alone does not provide enough fuel to enable a catastrophic failure of the gas turbine. Only after the fuel combustion has taken place the main line is opened.

Another embodiment of the invention relates to an apparatus for regulating the flow of fuel in a gas turbine. Such apparatus comprises a main line that can be connected in fluid communication with a fuel source and with a nozzle array for injecting fuel into a combustion chamber of a gas turbine. The apparatus also comprises a main flow regulator placed on the main line and configured to vary the flow of fuel on the main line up to a main line maximum flow rate.

An auxiliary line is placed in fluid communication with the fuel source and the nozzle array for transferring fuel from the fuel source to the nozzle array. An auxiliary flow regulator is placed on the auxiliary line and is configured to vary the flow of fuel on the auxiliary line up to an auxiliary line maximum flow rate. The auxiliary line maximum flow rate is less than the main line maximum flow rate.

A third embodiment of the invention relates to a method of upgrading a previous apparatus for regulating the flow of fuel in a gas turbine. The previous apparatus is connected to a nozzle array and to a fuel source for injecting fuel into a combustion chamber of a gas turbine. The previous apparatus comprises a main line in fluid communication with the fuel source and the nozzle array, so as to transfer fuel from the fuel source to the nozzle array. The previous apparatus also comprises a main flow regulator placed on the main line and configured to vary the flow of fuel on the main line up to a main line maximum flow rate.

The method of upgrading the previous apparatus itself comprises the steps of providing an auxiliary line and placing it in fluid communication with the fuel source and with the nozzle array, so as to transfer fuel from the fuel source to the nozzle array. The auxiliary is sized so that its maximum flow rate is less than the main line maximum flow rate. An auxiliary flow regulator is then placed on the auxiliary line to vary the flow of fuel on the auxiliary line up to an auxiliary line maximum flow rate.

In an embodiment, this allows to apply the above described method for starting a gas turbine to an apparatus not specifically designed for it.

BRIEF DESCRIPTION OF THE DRAWINGS

Further details and specific embodiments will refer to the attached drawings, in which.

DETAILED DESCRIPTION

Figure 1:
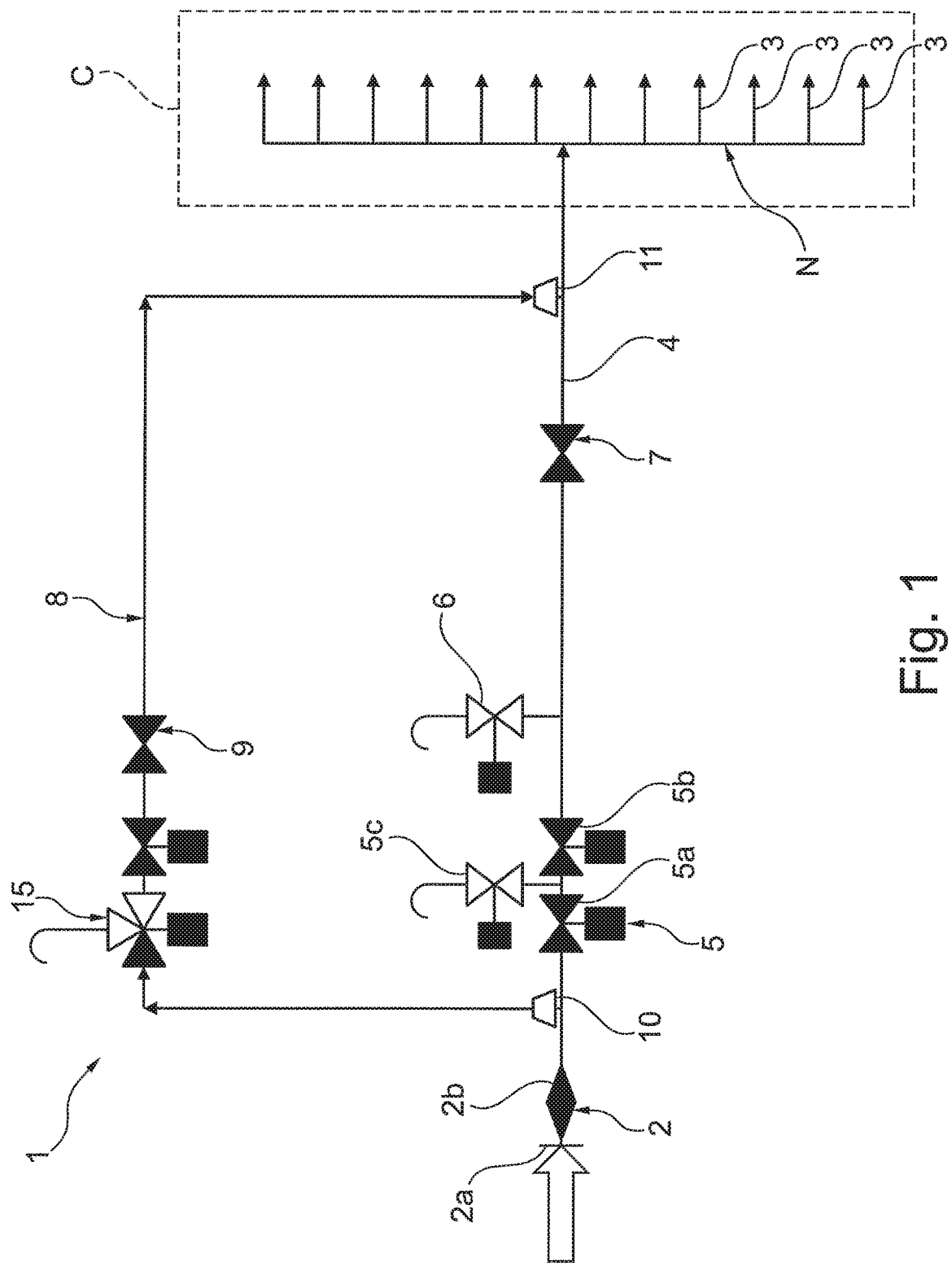
FIG. 1 is a schematic representation of an apparatus for regulating the flow of fuel in a gas turbine according to a first embodiment of the present invention.

The following description of exemplary embodiments refers to the accompanying drawings. The same reference numbers in different drawings identify the same or similar elements. The following detailed description does not limit the embodiments of the present invention. Instead, the scope is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Therefore, an apparatus for regulating the flow of fuel in a gas turbine will be described by referring to the attached figures, in which will be indicated with the number 1.

Such apparatus 1 is designed to transfer the fuel to a combustion chamber "C", which is provided with a plurality of nozzles 3. Indeed, the combustion chamber may comprise one or more array "N" of nozzles 3. As shown for example in FIG. 3, the nozzle array "N" (itself not part of the invention) comprises a first 3a and a second set 3b of nozzles 3. In the embodiment shown in FIG. 3 the first set 3a of nozzles 3 comprises the primary nozzles 3. The second set 3b comprises the secondary nozzles 3.

In further embodiments, not shown, there may be as many set of nozzles 3 as it is deemed necessary by the project specifications.

The combustion chamber "C" is not considered as part of the present invention, and will not be described in further detail.

The apparatus 1 comprises a fuel source 2. Indeed, the fuel source 2 comprises one fuel inlet 2a, associated with a respective inlet strainer 2b.

A main line 4 for the transfer of fuel is placed in fluid communication with the fuel source 2. Also, the main line 4 is placed in fluid communication with one or more nozzles 3. Indeed, in the context of the present disclosure the main line 4 is considered to be the path of the fuel between the fuel source 2 and the nozzles 3. It is to be noted that such path may comprise more than one parallel physical paths between the fuel source 2 and the nozzles 3.

Along the main line 4 is placed a sealing device 5, also referred to as "block and bleed" in the technical field. The sealing device 5 comprises a set of valves 5a, 5b, 5c. A first 5a and a second valve 5b are arranged serially along the main line 4. A third valve 5c is connected in fluid communication with the main line 4 between the first 5a and the second valve 5b so that, when opened, can vent the gas entrapped between the first 5a and the second valve 5b. This arrangement is such that during the functioning of the gas turbine, the third valve 5c is closed while both the first 5a and the second valve 5b are kept open. In this way, fuel can flow along the main line 4. When the gas turbine is not working both the first 5a and the second valve 5b are kept closed, and the third valve 5c is kept open. In this way, any fuel leaks from the first 5a and the second valve 5b will be allowed to vent away from the main line 4 by the third valve 5c, thus preventing any potential accumulation of fuel inside the combustion chamber "C".

In an embodiment, a vent valve 6 is present on the main line 4 downstream of the sealing device 5.

Figure 3:
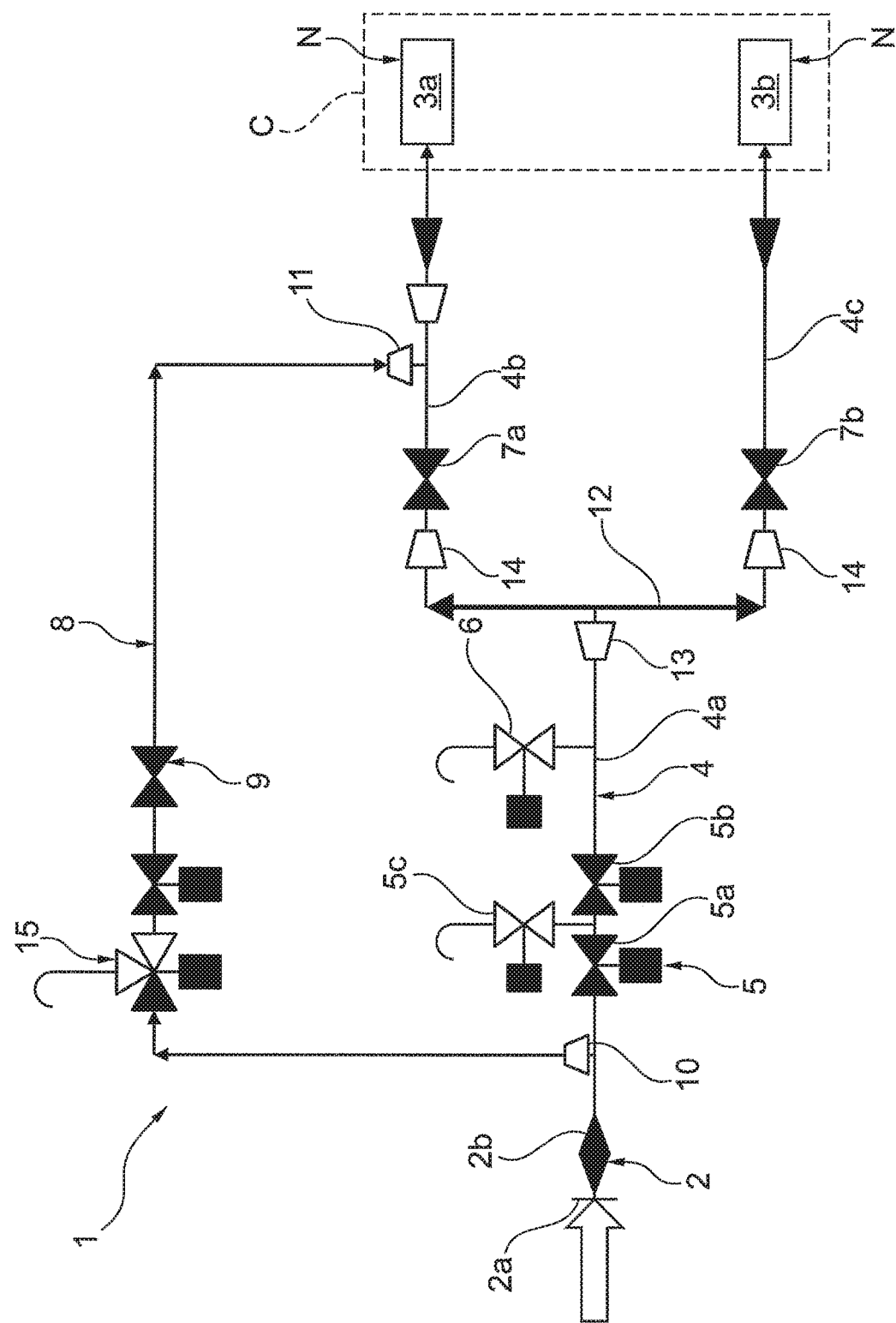
FIG. 3 is a schematic representation of an apparatus for regulating the flow of fuel in a gas turbine according to a third embodiment of the present invention.

In the embodiment shown in FIG. 3, the main line 4 branches to reach the first 3a and the second set 3b of nozzles 3. Indeed, the main line comprises a main branch 4a which branches into a primary 4b and into a secondary branch 4c, The primary branch 4b is placed in fluid connection with the main branch 4a and with the first set 3a of nozzles 3. Similarly, the secondary branch 4c is placed in fluid connection with the main branch 4a and with the second set 3b of nozzles 3. In this arrangement, the above described sealing device 5 and vent valve 6 are placed on the main branch. 4a of the main line 4.

The main line 4 can comprise an expansion zone 12. As shown in FIG. 3, the expansion zone 12 is placed between the main branch 4a and the primary 4b and secondary branches 4c, A divergent portion 13 connects the main branch 4a to the expansion zone 12. A convergent portion 14 connects each of the primary 4b and secondary 4c branches to the expansion zone 12. In an embodiment, this helps to dampen any pressure fluctuation on the main line 4 before it reaches the nozzles 3.

In an embodiment, a main flow regulator 7 is placed on the main fuel line 4 downstream of the sealing device 5. Also, the main flow regulator 7 is placed downstream of the vent valve 6. Such main flow regulator 7 is configured to vary the flow of fuel on the main fuel line 4 up to a main line maximum flow rate. In the embodiment from FIG. 3, each of the primary 4b and secondary 4c branch is provided with its own flow regulator. With more detail, the apparatus 1 may comprise a primary flow regulator 7a on the primary branch 4b of the main line 4. Similarly, the apparatus 1 may comprise a secondary flow regulator 7b on the secondary branch 4c of the main line 4. The primary 7a and the secondary flow regulator 7b are substantially similar to the main flow regulator 7 described above. If the specifications require it, the primary 7a and the secondary 7b flow regulators may be sized differently. It is to be noted that in this arrangement no main flow regulator 7 is actually present.

An auxiliary line 8 is placed in fluid communication with the fuel source 2. The auxiliary line is also placed in fluid communication with at least some of the nozzles 3, so that it can transfer fuel from the inlet 2a to the nozzles 3. The purpose of the auxiliary line 8 is to provide an intrinsically safe way to start the gas turbine, as its maximum flow can be sized so as to be enough to start the gas turbine but not too much as to create the danger of an explosion.

With more detail, in one embodiment of the invention the pipes of the auxiliary line 8 has a lesser internal diameter than the pipes of the main line 4. Additionally, in an embodiment, the auxiliary line 8 comprises a convergent portion 10 directly attached to the main line 4 upstream of the main flow regulator 7. In particular, the auxiliary line 8 branches from the main line 4 upstream of the sealing device 5.

Figure 2:
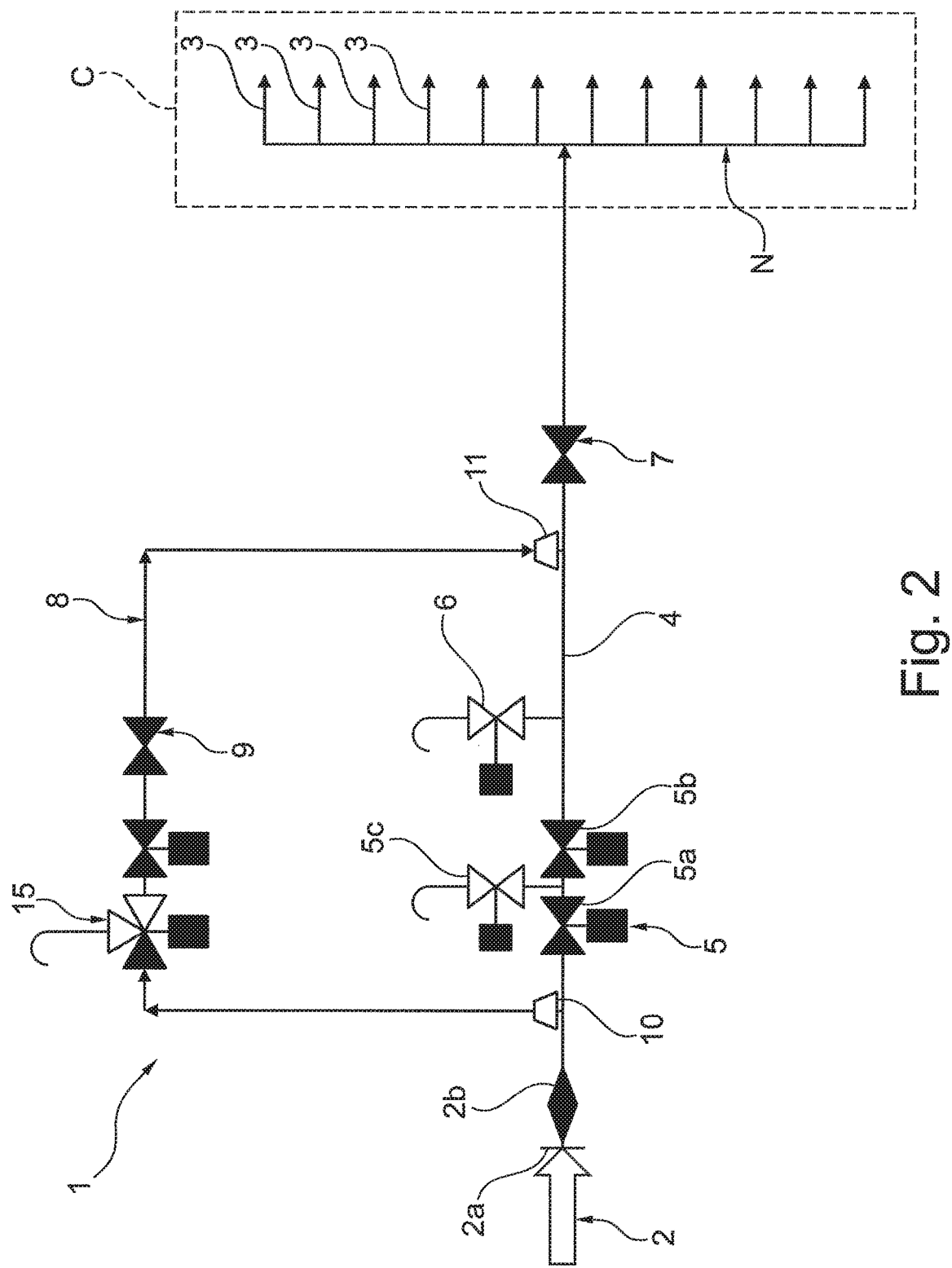
FIG. 2 is a schematic representation of an apparatus for regulating the flow of fuel in a gas turbine according to a second embodiment of the present invention.

In the embodiment shown in FIG. 1, the auxiliary line 8 connects back to the main line 4 downstream of the main flow regulator 7.

in the embodiment shown in FIG. 2, the auxiliary line 8 connects back to the main line 4 upstream of the main flow regulator 7.

In the embodiment shown in FIG. 3, the auxiliary line 8 connects back to the primary branch 4b of the main line 4, in particular downstream of the expansion zone 12. Similarly to the embodiment shown in FIG. 2, the auxiliary line 8 connects to the primary branch 4b downstream of the primary flow regulator 7a. Another variant is possible (not shown in the drawings) in which the auxiliary line 8 connects to the primary branch 4b upstream of the primary flow regulator 7a.

The auxiliary line 8 comprises a divergent portion 11 directly attached to the main line 4 or, in case of the embodiment from FIG. 3, to the primary branch 4b of the main line 4.

The auxiliary line 8 is provided with its own auxiliary sealing device 15. Such auxiliary sealing device 15 is substantially similar to the sealing device 5 described above.

The auxiliary line 8 is provided with an auxiliary flow regulator 9, which is configured to vary the flow of fuel on the auxiliary fuel line 8 itself. Indeed, the auxiliary flow regulator 9 ensures that the flow along the auxiliary line 8 can never exceed the auxiliary line 8 maximum flow rate. This maximum flow rate is less than the Maximum flow rate of the main line 4. The auxiliary flow regulator 9 is in particular placed directly downstream with respect to the auxiliary sealing device 15.

According to a first embodiment, the auxiliary flow regulator 9 is an orifice. This simplistic embodiment can be employed if the fuel composition is relatively constant (a variation of about 5% of the calorific content of the fuel is admissible). According to another embodiment, the auxiliary flow regulator 9 is a valve. This allows to vary the composition of the fuel without constraints, at the cost of greater complexity.

In detail, the auxiliary line 8 maximum flow rate is less than the Lower Explosive Limit. The Lower Explosive Limit is defined as the minimum concentration of fuel in a fuel/air mixture such as a spark can ignite the mixture and cause it to explode. In other words, no explosion is possible if the fuel concentration is below the Lower Explosive Limit. Such Lower Explosive Limit generally corresponds to a fuel flow rate of about 15% of the maximum total flow rate. The exact value of the LEL depends on the physical/chemical properties of the fuel, on the temperature of the air, and on other general physical properties so that its precise value can easily be computed by the person skilled in the art if all such properties are known or can be reasonably assumed to be inside a specific range (such as is generally the case during the design of a gas turbine).

The apparatus 1 may also comprise a flame detector (not shown in the drawings) active on the combustion chamber of the gas turbine. In an embodiment, the flame detector is optical, and ensures that a control system of the apparatus 1 can react to any changes in the combustion chamber.

In order to start the gas turbine, the main shaft of the gas turbine is initially moved by a starting engine (both are not shown in the drawings). Thus an initial air flow is established in the gas turbine and, in particular, in the combustion chamber "C". In this way, the combustion chamber "C" is purged from eventual residue of fuel which may be still inside.

After the purging phase, a spark is started inside the combustion chamber "C". The fuel flow is then slowly increased inside the combustion chamber "C". With more detail, the main line 4 is kept sealed, while the fuel flow rate in the auxiliary line is increased. In other words, the gas turbine is fired while keeping the main line 4 sealed. Indeed, the gas turbine is fired using only fuel from the auxiliary line.

With additional detail, in the embodiment shown in FIG. 2 the main flow regulator 7 is opened at a preset stroke. The auxiliary flow regulator 9 is controlled in order to achieve a predetermined pressure value upstream of the main flow regulator 7. With more detail, the preset pressure value is not constant, but is a function of the rotational speed of the turbomachine. Since the main flow regulator 7 is fixed at this stage, the fuel flow inside the combustion chamber "C" is only a function of the pressure upstream of the main flow regulator 7.

The combustion can therefore start in the gas turbine. With additional detail, the method comprises a step of detecting a flame inside the combustion chamber. In an embodiment, such step is performed before the main line 4 opening step. In particular, such step is performed by the above-mentioned flame detector.

Afterwards, the main line 4 is opened in order to increase the main line 4 fuel flow rate. With more detail, after the auxiliary flow regulator 9 is completely opened the gas turbine is warmed up for several minutes. Afterwards, the sealing device 5 is gradually opened, in particular with reference to the first 5a and second valve 5b. The main flow regulator 7 can then be controlled in order to further increase the flow of fuel inside the combustion chamber "C".

In the embodiments from FIGS. 1 and 3 the startup sequence is similar to the one described above. However, the auxiliary flow regulator 9 is not controlled as a function of a preset pressure, but is placed in sonic condition and targets a predetermined auxiliary line 8 flow rate directly. Additionally, after the auxiliary line 8 maximum flow rate is achieved, the main flow regulator 7 is opened at a preset stroke. Afterwards, the sealing device 5 is gradually opened, in particular with reference to the first 5a and second valve 5b. During this phase the auxiliary flow regulator 9 is gradually closed, so that the total flow rate can remain constant. After the auxiliary flow regulator 9 is completely closed, the main flow regulator 7 can be controlled in order to further increase the flow of fuel inside the combustion chamber "C".

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:

1. A method of starting a gas turbine, the gas turbine comprising an apparatus for regulating a flow of fuel to a combustion chamber in the gas turbine, the apparatus comprising a main fuel line extending between a fuel source and a branch point fluidly coupled to a plurality of nozzles of a nozzle array, the plurality of nozzles of the nozzle array extending from the branch point for transferring fuel from the fuel source to the plurality of nozzles of the nozzle array, wherein the plurality of nozzles of the nozzle array is configured to inject fuel into the combustion chamber, the apparatus further comprising an auxiliary fuel line extending from a first end fluidly coupled to the main fuel line to a second end fluidly coupled to the main fuel line downstream of the first end and upstream of the branch point, the auxiliary fuel line configured to be selectively placed in fluid communication with each of the fuel source and the plurality of nozzles of the nozzle array for transferring all fuel received at the first end from the fuel source to the second end upstream of the branch point, the method comprising:

keeping the main fuel line in a sealed state inhibiting fuel from flowing from the fuel source to the plurality of nozzles of the nozzle array via the main fuel line, while delivering a flow of fuel from the fuel source to the plurality of nozzles of the nozzle array via the auxiliary fuel line, the auxiliary fuel line having a lesser internal diameter than an internal diameter of the main fuel line such that a concentration of the fuel delivered via the auxiliary fuel line in a fuel air mixture within the combustion chamber is below a predetermined lower explosive limit;

firing the gas turbine while keeping the main fuel line in the sealed state; and after combustion has started in the combustion chamber, (i) opening the main fuel line from the sealed state to commence a flow of fuel from the fuel source to the plurality of nozzles of the nozzle array via the main fuel line, (ii) sealing the auxiliary fuel line to inhibit the flow of fuel from the fuel source to the plurality of nozzles of the nozzle array via the auxiliary fuel line, and (iii) after the auxiliary fuel line is sealed, increasing the flow of fuel flowing from the fuel source to the plurality of nozzles of the nozzle array via the main fuel line.

2. The method of claim 1, wherein the lesser internal diameter of the auxiliary fuel line defines a predetermined auxiliary fuel line maximum flow rate, and wherein the method further comprises:

regulating the flow of fuel flowing in the auxiliary fuel line up to the predetermined auxiliary fuel line maximum flow rate via an auxiliary flow regulator acting on the auxiliary fuel line.

3. The method of claim 1, wherein the predetermined lower explosive limit is about 15% of a maximum total flow rate.

4. The method of claim 1, further comprising regulating the flow of fuel flowing in the main fuel line up to a predetermined main fuel line maximum flow rate via a main flow regulator acting on the main fuel line, and regulating the flow of fuel flowing in the auxiliary fuel line up to a predetermined auxiliary fuel line maximum flow rate via an auxiliary flow regulator acting on the auxiliary fuel line.

5. The method of claim 4, further comprising controlling the auxiliary flow regulator to achieve a predetermined pressure value upstream of the main flow regulator.

6. The method of claim 5, wherein the predetermined pressure value is a function of a rotational speed of the gas turbine.

7. An apparatus for regulating a flow of fuel in a gas turbine, the apparatus comprising:

a fuel source;

a main fuel line extending between the fuel source and a branch point and configured to channel all fuel received from the fuel source to the branch point;

a nozzle array comprising a plurality of nozzles extending from the branch point, the nozzle array configured to inject fuel from the fuel source into a combustion chamber of a gas turbine;

a main fuel line regulating valve placed on the main fuel line and configured to selectively seal the main fuel line to prevent fuel in the main fuel line from being injected into the combustion chamber and to open the main fuel line to allow a flow of fuel in the main fuel line to be injected into the combustion chamber, the main fuel line regulating valve further configured to vary the flow of fuel in the main fuel line up to a predetermined main fuel line maximum flow rate;

an auxiliary fuel line extending from a first end fluidly coupled to the main fuel line to a second end fluidly coupled to the main fuel line downstream of the first end and upstream of the nozzle array, the auxiliary fuel line having a lesser internal diameter than an internal diameter of the main fuel line such that a concentration of fuel delivered via the auxiliary fuel line in a fuel air mixture within the combustion chamber is below a predetermined lower explosive limit, the auxiliary fuel line configured to be selectively placed in fluid communication with each of the fuel source and the plurality of nozzles of the nozzle array for transferring all fuel received at the first end from the fuel source to the second end upstream of the branch point; and an auxiliary fuel line regulating valve placed on the auxiliary fuel line and configured to seal the auxiliary fuel line to selectively prevent fuel in the auxiliary fuel line from being injected into the combustion chamber and to open the auxiliary fuel line to allow a flow of fuel in the auxiliary fuel line to be injected into the combustion chamber, wherein, prior to combustion in the combustion chamber, the main fuel line regulating valve seals the main fuel line and the auxiliary fuel line regulating valve allows the flow of fuel in the auxiliary fuel line to be injected via the nozzle array into the combustion chamber, and once combustion commences, the auxiliary fuel line regulating valve seals the auxiliary fuel line and the main fuel line regulating valve allows the flow of fuel in the main fuel line to be injected via the nozzle array in the combustion chamber at a controlled flow rate.

8. The apparatus of claim 7, wherein the lesser internal diameter of the auxiliary fuel line defines a predetermined auxiliary fuel line maximum flow rate, and wherein the auxiliary fuel line regulating valve is configured to regulate the flow of fuel flowing in the auxiliary fuel line up to the predetermined auxiliary fuel line maximum flow rate.

9. The apparatus of claim 7, wherein the predetermined lower explosive limit is about 15% of a maximum total flow rate.

10. The apparatus of claim 7, wherein the main fuel line regulating valve is configured to regulate the flow of fuel flowing in the main fuel line up to the predetermined main fuel line maximum flow rate, and wherein the auxiliary fuel line regulating valve is configured to regulate the flow of fuel flowing in the auxiliary fuel line up to a predetermined auxiliary fuel line maximum flow rate.

11. The apparatus of claim 10, wherein the auxiliary fuel line regulating valve is further configured to achieve a predetermined pressure value upstream of the main fuel line regulating valve.

12. The apparatus of claim 11, wherein the predetermined pressure value is a function of a rotational speed of the gas turbine.

13. The apparatus of claim 7, further comprising an inlet strainer disposed on the main fuel line upstream of the first end.

14. The apparatus of claim 7, further comprising a sealing device that includes a first valve, a second valve, and a third valve arranged serially along the main fuel line, the third valve is connected in fluid communication with the main fuel line between the first valve and the second valve.

15. The apparatus of claim 7, wherein the auxiliary fuel line comprises a convergent portion at the first end directly attached to the main fuel line.

16. The apparatus of claim 7, further comprising a manifold extending from the branch point, each nozzle of the plurality of nozzles extending from the manifold.

17. The apparatus of claim 7, wherein the main fuel line includes a main branch, an expansion zone extending from the main branch, a primary branch extending from the expansion zone to a first set of nozzles of the nozzle array, and a secondary branch extending from the expansion zone to a second set of nozzles of the nozzle array, and wherein the auxiliary line extends from the main branch to the primary branch.

18. The apparatus of claim 17, wherein a convergent portion connects each of the primary branch and the secondary branch to the expansion zone to dampen pressure fluctuations on the main fuel line, and wherein the auxiliary fuel line extends from the main branch to the primary branch downstream of the convergent portion of the primary branch.

19. The apparatus of claim 17, wherein a primary flow regulator is disposed on the primary branch, wherein a secondary flow regulator is disposed on the secondary branch, and wherein the auxiliary fuel line extends from the main branch to the primary branch downstream of the primary flow regulator.

\* \* \* \* \*